Jan. 20, 1948. O. SANDBERG 2,434,772
ARTICLE FEEDING MECHANISM FOR WRAPPING MACHINES
Filed July 27, 1942 2 Sheets-Sheet 1
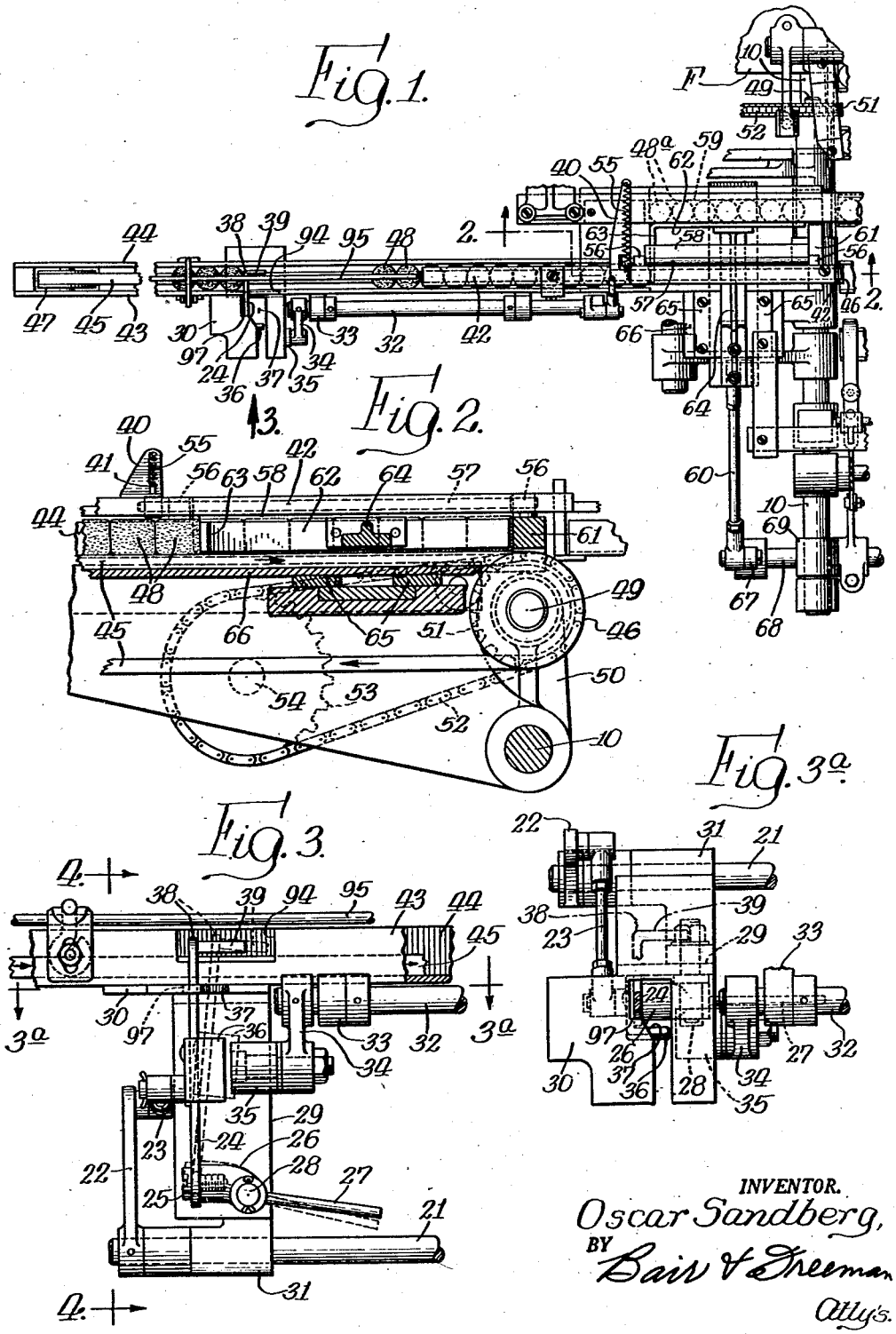
INVENTOR.
Oscar Sandberg,
BY
Bair & Freeman
Atty's

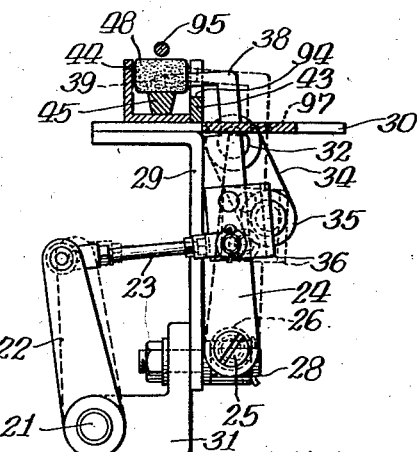

Patented Jan. 20, 1948

2,434,772

UNITED STATES PATENT OFFICE 2,434,772

ARTICLE FEEDING MECHANISM FOR WRAPPING MACHINES

Oscar Sandberg, Defiance, Ohio, assignor to Lynch Package Machinery Corporation, Toledo, Ohio, a corporation of Ohio Application July 27, 1942, Serial No. 452,444

4 Claims. (Cl. 198—24)

My present invention relates to feeding mechanism for feeding articles, such as a plurality of pieces of candy, to a wrapping machine, the plurality of pieces being deposited on a piece of cardboard having its sides bent up to form a "boat" to contain the pieces of candy, and the plurality of pieces being wrapped in a single wrapper.

One object of the invention is to provide article feeding mechanism of the general character just mentioned wherein a feed conveyor is provided on which small pieces of candy may be placed to be conveyed in one direction toward mechanism for pushing a predetermined number of pieces of candy laterally with respect to the feed conveyor and then toward a position for being wrapped in the wrapping mechanism of a wrapping machine such as one of the type shown in my Patent No. 2,208,776, dated July 23, 1940, or my Patent No. 2,283,097, dated May 12, 1942.

Another object is to provide control mechanism for the candy pusher which pushes the candy laterally so that the candy pusher is operated only if there is a sufficient supply of the pieces of candy on the feed conveyor to fill a package.

With these and other objects in view, my present invention consists in the construction, arrangement and combination of the various parts of my article feeding mechanism whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a plan view of my article feeding mechanism viewed standing on the right side of the machine;

Figure 2 is an enlarged sectional view on the line 2—2 of Figure 1, illustrating portions of the candy pusher assembly;

Figure 3 is a rear elevation on an enlarged scale showing a candy trip assembly, and the position of this assembly is indicated by the arrow 3 in Figure 1, the arrow, in turn, indicating the direction of observation for Figure 3;

Figure 3a is an enlarged sectional view on the line 3a—3a of Figure 3;

Figure 4 is a sectional view of the candy trip assembly as taken on the line 4—4 of Figure 3;

Figure 5 is a vertical sectional view of parts shown in Figure 1, looking toward the right in that figure; and Figure 6 is a similar view on the reverse side of the machine as shown in Figure 5 to show the operating parts connected with a shaft 21 of Figure 5.

On the accompanying drawings I have used the reference character F to indicate generally a main frame of a wrapping machine. The frame F has a pair of rigid supporting rods, one of which is shown at 10 extending rearwardly from the frame (downwardly in Figure 1). The rods support a pocket conveyor having pockets as shown in my Patent No. 2,378,796 of June 19, 1945, to receive a plurality of pieces of candy to be wrapped in a common wrapper.

My article feeding mechanism includes a feed conveyor comprising a pair of side bars 43 and 44 and a belt 45, the belt forming a bottom for the feed conveyor. The belt 45 passes clockwise around a drive pulley 46 (see Fig. 2) above the rod 10 and around an idler pulley 47 at the outer end of the feed conveyor. The feed conveyor is preferably two or three feet long to give plenty of space for an operator to place pieces of candy 48 therein. The inner end of the feed conveyor has a candy hold-down bar 42, spaced above the belt 45.

For rotating the drive pulley 46 I provide a shaft 49 journalled in a bearing 50 mounted on the rod 10. The pulley 46 is secured to the shaft 49 and the shaft has mounted thereon a small sprocket 51 connected by a chain 52 with a large sprocket 53. The sprocket 53 is mounted on a shaft 54 journalled in the frame F and driven in the manner disclosed in my last mentioned patent at a somewhat higher speed than required for feeding the proper number of pieces of candy 48 to the pocket conveyor so as to always insure a sufficient supply therefor, the belt merely slipping under the pieces of candy when they are halted as will hereinafter be described.

A certain number of pieces of candy 48 are adapted to be fed each operating cycle, seven in the illustrated instance. In order to segregate these seven pieces from the row of candy in the feed conveyor 43—44—45, I provide a fixed candy stop 61 for the foremost piece of candy and a pusher assembly including a first pusher bar 62 for pushing the candy laterally (or forwardly with respect to the operator) from a position in line with the feed conveyor and under the candy hold-down bar 42, to the position illustrated by dotted lines as 48ª, just ahead of this bar at the center of Figure 1. The bar 62 has a right-angled candy holding portion 63 to hold the row of candy in the feed conveyor from undesirable feeding while the pusher bar 62 is in its forward position.

The pusher bar 62 (see Figs. 1 and 5) is mounted on a slide member 64 which is suitably guided in a pair of slideways 65 mounted on a candy feed plate 66 onto which the candy is fed from between the conveyor sides 43 and 44, and which supports the candy while being pushed from its rearward position to its forward position. For operating the slide member 64, I provide a link 60 pivoted to an arm 67 which in turn is secured to a rock shaft 68. The rock shaft 68 is journalled in a bearing bracket 69 extending downwardly from the supporting rod 10.

The rock shaft 68 is rocked by an arm 75 depending therefrom and connected by a link 76 with an arm 77. The arm 77 is pivoted at 78 to a side frame 72 mounted on the main frame F and carries a roller 79. The roller 79 is received in a cam groove 80 of a cam disc 81. The cam disc is secured to a drive disc 82 by clamp screws 83 passing through arcuate slots 84 of the drive disc so that the position of the cam may be adjustable for timing the oscillations of the pusher bar 62 with relation to the other operating parts of the article feeding mechanism.

The drive disc 82 is mounted on a shaft 70 journalled in a bearing 85 of the side frame 72 and carries a bevel gear 86 (see Fig. 6). The bevel gear 86 meshes with a bevel gear 87 on a countershaft 88. The countershaft is journalled in bearing brackets 89 secured to the side frame 72 and in turn is driven by a sprocket 90 and a chain 91 from a sprocket 92. The sprocket 92 is mounted on a countershaft 93 which countershaft bears the same reference numeral as in my Patent No. 2,378,796 and is continuously driven as disclosed therein.

After the seven pieces of candy are pushed laterally from the feed conveyor (forwardly in the machine) by the pusher bar 62, they are pushed in a direction parallel to the length of the feed conveyor into one of its pockets 17 as shown in said patent.

The pieces of candy 48 at this time are confined between the first pusher bar 62 and a bar 59 (Fig. 1) forming a front wall of a trough to guide the pieces of candy into the pocket. Before the pusher bar 62 operates, it assumes a position in alignment with the feed conveyor side 43, and a gate 58 forms a second side in alignment with the conveyor side 44 so as to keep the pieces of candy in alignment as they are pushed to the right in Figure 1 by the conveyor belt 45 onto the feed plate 66. The gate 58 is secured along its top edge to a rock shaft 57 journalled in bearings 56 (Fig. 5). The gate is normally constrained to lowered position by a spring 55 connected at one end to a pin 41 extending upwardly from the rock shaft 56 and at its other end to a stationary bracket 40. As the pusher bar 62 moves forwardly it pushes the seven pieces of candy against the gate 58 to swing it forwardly and upwardly to the position shown in Figures 1 and 5, and it remains in this position until the pusher bar 62 is pulled back again by the link 60 to its initial position in alignment with the feed conveyor side 43.

It is undesirable to rotate the shaft 88 and thereby rock the shaft 68 for operating the candy pusher bar 62 when there are not enough pieces of candy 48 fed into position in front of the pusher bar 62 to fill a package. Accordingly, I provide a candy trip mechanism for controlling a clutch comprising a pawl 11 (see Fig. 6) secured to an arm 12 of the shaft 88 and cooperating with a notched drive disc 13 rotatable with the sprocket 90. The sprocket 90 is freely rotatable on the shaft 88 and carries with it the disc 13, a collar 14 being provided to confine the sprocket and the disc in position.

The clutch 11—13 is of the type wherein a stop lever 15 interposed in the path of rotation of the pawl 11 will disengage the pawl from the notch of the disc upon a shoulder 16 of the pawl engaging the stop lever. Whenever the stop lever is swung out of the way, then the pawl drops into the notch of the disc and is carried along with the disc.

The stop lever 15 is pivoted at 18 to the side frame 72 and is connected by a link 19 to an arm 20. The arm 20 is secured to a rock shaft 21 which extends toward the left side of the machine through the side frame 72 and toward the feed conveyor 43—44—45. A spring 96 is connected to the link 19 to constrain the rock shaft 21 to rotate clockwise in Figure 6 (counterclockwise in Figs. 4 and 5).

The rock shaft 21 finally terminates in an arm 22 (see Figs. 3, 3a and 4) connected by a link 23 with a trip lever 24. The trip lever 24 is pivoted on a shoulder screw 25 which in turn is secured to a pivot fitting 26. A rod 27 extends from the fitting 26 and serves as a counterweight and an operating handle. The fitting 26 is pivoted on a stud 28 supported by a bracket 29. The major weight of the elements 24 and 26 is on the left side of the pivot 28 in Figure 3 to thereby normally bias the trip lever 24 counterclockwise.

The bracket 29 is secured to a latch plate 30 and both are secured to the bottom of the feed conveyor side bars 43—44. The bracket 29 also supports a bearing 31 for the rock shaft 21.

Another rock shaft 32 is journalled at its outer end in a bearing 33 and terminates in an arm 34 which carries a roller 35. The bearing 33 is supported on the feed conveyor frame adjacent the bracket 29. The trip lever 24 carries a flange 36 adapted, when in the dotted position of Figure 3, to coact with the roller 35 as will hereinafter appear.

The trip lever 24 extends through a notch 37 of the latch plate 30 (see Figs. 1 and 3a) and normally (when the feed conveyor is empty) assumes a position back of a shoulder 97 of the notch. The upper end of the trip lever terminates in a finger 38 having a right angled extension 39 (see Figs. 3 and 3a). The finger 38 extends through a notch 94 of the feed conveyor side bar 43 and is located so as to be engaged by the foremost piece of candy 48 in the conveyor against the finger. The rock shaft 32 is oscillated each cycle of operation of the wrapping machine by mechanism which is fully disclosed in my Patent No. 2,378,796.

*Practical operation*

In the operation of my article feeding mechanism for wrapping machines the operator stands at the back of the machine (lower side of the plan view, Fig. 1) and deposits the pieces of candy 48 in the outer end of the feed conveyor 43—44—45. The pieces of candy pass under a hold-down rod 95 and are carried along by the belt 45 at a rate of speed somewhat higher than necessary to keep the machine supplied.

Assuming that the rock shaft 32 (extending to the candy trip mechanism of Figs. 3 and 4) is rocked each wrapping cycle, and the trip lever 24 being normally constrained counterclockwise in Figure 4 by the spring 96 of Figure 6, then the trip lever 24 is back of the shoulder 97 of the notch 37 in the latch plate 30. When ten or eleven pieces of candy have accumulated in the feed conveyor, the pressure thereof against the finger 38 of the trip lever will be sufficient to move the trip lever forwardly in the notch 37 until it disengages from the shoulder 97 (dotted position of Fig. 3). Such pressure is caused by the friction of the pieces of candy on the belt 45 as the belt travels to the right. Obviously, a greater number of pieces will cause greater friction, and therefore greater pressure.

The rock shaft 21 is sufficiently constrained counterclockwise by the spring 96 for operation of this character when three or four pieces above the required number for a full package are deposited in the feed conveyor and the foremost engaged with the finger 38 by movement of the belt 45.

Movement of the trip lever 24 forwardly in the notch 37 will place the flange 36 in the path of movement of the roller 35 on the continuously oscillating arm 34 (one each cycle) so that the roller will engage the flange and swing the trip lever to the right in Figure 4 to the dotted line position thus rotating the control shaft 21 clockwise. This clockwise rotation moves the finger 38 out of the path of the pieces 48 and engages the control clutch 11—13 for effecting oscillation of the shaft 68.

The shaft 68 operates the pusher bar 62 for pushing the desired number of pieces of candy laterally with respect to the feed conveyor to the dotted position in Figure 1 aligned with one of the pockets of the pocket conveyor. After the pieces of candy are pushed laterally they are delivered to the pocket conveyor as disclosed in my Patent No. 2,378,796. As long as there is a continuous row of the pieces 48 they will engage the extension 39 of the trip lever 24 for preventing its return to the solid line position of Figure 4. Whenever the feed conveyor 43—44—45 runs out of candy however the weight of the arm 24 on the stud 28 will cause it to swing back through the notch 37 and behind the shoulder 97 thereof, thus moving the clutch controlling rock shaft 21 to the de-clutched position and stopping the oscillations of the rock shaft 68.

From the foregoing disclosure it will be obvious that I have provided a feeding mechanism for feeding articles in groups to the wrapping mechanism of a wrapping machine. I have provided means to control certain operations of the machine in response to the number of articles in the feed conveyor so that there is no unnecessary operation when articles are lacking and no possibility of wrapping less than the required number of articles to fill the package.

Some changes may be made in the construction and arrangement of the parts of my feeding mechanism for wrapping machines without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In an article feeding mechanism, a feed conveyor adapted to receive a row of articles, said feed conveyor including a conveyor belt on which the articles are deposited, a pusher member for pushing a predetermined number of the articles from said feed conveyor, and means for operating said pusher member only when there is greater than said predetermined number of articles on said feed conveyor, said means including a trip lever projecting laterally into the feed conveyor and adapted to be engaged by the row of articles therein, said trip lever being loaded in opposition to the direction of advance of the articles, a shoulder against which said trip lever normally engages, the friction of said feed conveyor belt against said row of articles thereon being sufficient to overcome the loading of said trip lever and disengage it from said shoulder when there are more than said predetermined number of articles in the feed conveyor, said trip lever being movable laterally from a position in front of the articles in said feed conveyor when so disengaged from said shoulder, control clutch mechanism for the operation of said pusher member, said control clutch mechanism being operable by said trip lever when it is so disengaged from said shoulder and moved laterally to clutch engaging position wherein the articles are free to be carried by said feed conveyor to said pusher member, and power means for effecting such lateral movement of said trip lever comprising a cyclically movable member for engaging said trip lever to move it laterally when said trip lever is disengaged from said shoulder.

2. In an article feeding mechanism, a feed conveyor adapted to receive a row of articles, said feed conveyor including a conveyor belt on which the articles are deposited, a pusher member for pushing a predetermined number of the articles from said feed conveyor, and means for operating said pusher member only when there is greater than said predetermined number of articles on said feed conveyor, said means including a trip lever projecting laterally into the feed conveyor and adapted to be engaged by the row of articles therein, said trip lever being loaded in opposition to the direction of advance of the articles, a shoulder against which said trip lever normally engages, the friction of said feed conveyor belt against said row of articles thereon being sufficient to overcome the loading of said trip lever and disengage it from said shoulder when there are more than said predetermined number of articles in the feed conveyor, said trip lever being movable laterally from a position in front of the articles in said feed conveyor when so disengaged from said shoulder, control clutch mechanism for the operation of said pusher member, said control clutch mechanism being operable by said trip lever when it is so disengaged from said shoulder, and means for engaging said control clutch mechanism comprising a cyclically movable member movable in a predetermined path, said trip lever being moved into such path when disengaged from said shoulder and thereupon moved by said cyclically movable member to control clutch engaging position.

3. In an article feeding mechanism, a feed conveyor adapted to receive a row of articles, a pusher member adjacent said feed conveyor, said pusher member being adapted for pushing a predetermined number of said articles to a position out of alignment with the feed conveyor, and means for operating said pusher member only when there is greater than said predetermined number of articles in said feed conveyor, said means including a trip lever projecting into the feed conveyor and adapted to be engaged by the row of articles therein, said trip lever being loaded to oppose the movement of the articles, a latch plate having a notch normally receiving said trip lever, the friction of said row of articles on said conveyor being sufficient to overcome the tension of the load acting on said trip lever and move it to a secondary position disengaged from said notch when there are more than said predetermined number of articles in the feed conveyor, power means for picking up said trip lever when in said secondary position and moving it to control clutch operating position, and control clutch mechanism for the operation of said pusher member rendered operable by said trip lever when it is moved to said control clutch operating position.

4. In an article feeding mechanism, a feed conveyor adapted to receive a row of articles, a pusher member adjacent said feed conveyor, said pusher member being adapted for pushing a predetermined number of said articles to a position out of alignment with the feed conveyor, and means for operating said pusher member only when there is greater than said predetermined number of articles in said feed conveyor, said means including a trip lever projecting into the feed conveyor and adapted to be engaged by the row of articles therein, said trip lever being loaded to oppose the movement of the articles, a latch plate having a notch normally receiving said trip lever, the friction of said row of articles on said conveyor being sufficient to overcome the tension of the load acting on said trip lever and move it to a secondary position disengaged from said notch when there are more than said predetermined number of articles in the feed conveyor, oscillatable power means for picking up said trip lever when in said secondary position and moving it to control clutch operating position, a control clutch mechanism for the operation of said pusher member rendered operable by said trip lever when it is moved to said control clutch operating position, said trip lever in said secondary position being in a position where it is engageable by said power means during its oscillation, and an element on said trip lever for engaging the sides of a continuous row of articles in said feed conveyor to prevent said trip lever from returning to said notch and thereby retain said control clutch mechanism engaged as long as there is continuous feed of articles by said feed conveyor.

OSCAR SANDBERG.

REFERENCES CITED

The following references are of record in the file of this patent:

UNITED STATES PATENTS

| Number | Name | Date |
|---|---|---|
| 1,117,433 | Owens | Nov. 17, 1914 |
| 1,142,025 | Christoe | June 8, 1915 |
| 1,247,722 | Rogers | Nov. 27, 1917 |
| 1,501,622 | Ruau | July 15, 1924 |
| 1,515,589 | Beckman | Nov. 18, 1924 |
| 1,689,404 | Quick | Oct. 30, 1928 |
| 1,832,344 | Wittman | Nov. 17, 1931 |
| 1,911,650 | Smith | May 30, 1931 |
| 1,980,411 | Kimball | Nov. 13, 1934 |
| 2,051,105 | Roberts | Aug. 18, 1936 |
| 2,053,418 | Braren | Sept. 8, 1936 |
| 2,144,761 | Herold | Jan. 24, 1939 |

FOREIGN PATENTS

| Number | Country | Date |
|---|---|---|
| 287,984 | Great Britain | Apr. 5, 1928 |
| 152,435 | Switzerland | Apr. 16, 1932 |